US011493818B2

(12) United States Patent
Yoder et al.

(10) Patent No.: US 11,493,818 B2
(45) Date of Patent: Nov. 8, 2022

(54) AUTONOMOUS LIGHT MANAGEMENT SYSTEM FOR A WINDOW AND METHOD OF CONTROLLING LIGHT TRANSMISSION

(71) Applicant: The Board of Trustees of the University of Illinois, Urbana, IL (US)

(72) Inventors: Mikayla A. Yoder, Eagan, MN (US); Marjorie M. Potter, Wyandotte, MI (US); Aaron Petronico, Spring, TX (US); Sean E. Lehman, Carroll, IA (US); Ralph G. Nuzzo, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 206 days.

(21) Appl. No.: 17/064,238

(22) Filed: Oct. 6, 2020

(65) Prior Publication Data

US 2021/0116768 A1 Apr. 22, 2021

Related U.S. Application Data

(60) Provisional application No. 62/915,685, filed on Oct. 16, 2019.

(51) Int. Cl.
*G02F 1/163* (2006.01)
*G02F 1/1333* (2006.01)
(Continued)

(52) U.S. Cl.
CPC ............... *G02F 1/163* (2013.01); *E06B 9/24* (2013.01); *G02F 1/13324* (2021.01);
(Continued)

(58) Field of Classification Search
CPC ............... G02F 1/163; G02F 1/13324; G02F 1/133305; G02F 1/13439; G02F 1/155;
(Continued)

(56) References Cited

U.S. PATENT DOCUMENTS 6,822,778 B2 11/2004 Westfall et al.
6,906,842 B2 6/2005 Agrawal et al.
(Continued)

OTHER PUBLICATIONS

Bae et al., "Roll-to-roll production of 30-inch graphene films for transparent electrodes" *Nature Nanotechnology*, 5 (2020) pp. 574-578.
(Continued)

*Primary Examiner* — Thoi V Duong
(74) *Attorney, Agent, or Firm* — Crowell & Morning LLP

(57) ABSTRACT

An autonomous light management system for a window includes an electrochromic film stack comprising an electrochromic layer on a first transparent electrode, an ion storage layer on a second transparent electrode, and an electrolyte sandwiched between the ion storage and electrochromic layers. The electrochromic film stack exhibits a transmissive state or an absorptive state depending on charging or discharging of the electrochromic layer. The light management system further comprises an array of power units disposed on a front surface of the electrochromic film stack, where each power unit comprises at least one solar microcell. Collectively, the solar microcells cover an area no greater than about 6% of a total area of the front surface. The array of power units is configured to control the charging and discharging of the electrochromic layer, thereby manipulating light transmission through the electrochromic film stack.

20 Claims, 8 Drawing Sheets
(1 of 8 Drawing Sheet(s) Filed in Color)

(51) Int. Cl.
*G02F 1/1343* (2006.01)
*G02F 1/155* (2006.01)
*E06B 9/24* (2006.01)
*G02F 1/133* (2006.01)

(52) U.S. Cl.
CPC .... *G02F 1/13439* (2013.01); *G02F 1/133305* (2013.01); *G02F 1/155* (2013.01); *E06B 2009/2417* (2013.01); *E06B 2009/2464* (2013.01)

(58) Field of Classification Search
CPC ............... G02F 1/15165; G02F 1/1523; G02F 2202/022; E06B 9/24; E06B 2009/2417; E06B 2009/2476
See application file for complete search history.

(56) References Cited

U.S. PATENT DOCUMENTS

| | | | |
|---|---|---|---|
| 7,256,923 | B2 | 8/2007 | Liu et al. |
| 7,593,154 | B2 | 9/2009 | Burdis et al. |
| 8,508,834 | B2 | 8/2013 | Huang et al. |
| 8,679,888 | B2 | 3/2014 | Rogers et al. |
| 8,976,440 | B2 | 3/2015 | Berland et al. |
| 9,176,357 | B2 | 11/2015 | Lam et al. |
| 2017/0323990 | A1 | 11/2017 | Yu et al. |
| 2019/0235341 | A1* | 8/2019 | Wang ...................... G02F 1/163 |

OTHER PUBLICATIONS

Bechinger et al., "Low-voltage electrochromic device for photovoltaic-powered smart windows," *Journal of Applied Physics*, 80 (1996) pp. 1226-1232.
Benson et al., "Design goals and challenges for a photovoltaic-powered electrochromic window covering," *Solar Energy Materials and Solar Cells*, 39 (1995) pp. 203-211.
Biesinger et al., "Resolving surface chemical states in XPS analysis of first row transition metals, oxides and hydroxides: Sc, Ti, V, Cu and Zn," *Applied Surface Science*, 257 (2010) pp. 887-898.
Bohnke et al., "Fast ion transport in new lithium electrolytes gelled with PMMA. 1. Influence of polymer concentration," *Solid State Ionics*, 66 (1993) pp. 97-104.
Bronstein et al., "Luminescent Solar Concentration with Semiconductor Nanorods and Transfer-Printed Micro-Silicon Solar Cells," *ACS Nano*, 8:1 (2014) pp. 44-53.
Carlson et al., "Transfer Printing Techniques for Materials Assembly and Micro/Nanodevice Fabrication," *Advanced Materials*, 24 (2012) pp. 5284-5318.
Cui et al., "All-Solid-State Complementary Electrochromic Windows Based on the Oxymethylene-Linked Polyoxyethylene Complexed with LiClO$_4$ ", *J. Appl. Polym. Sci.*, 65:9 (1997) pp. 1739-1744.
Deb, "A Novel Electrophotographic System," *Appl. Opt.*, 8:S1 (1969) pp. 192-195.
Deb et al., "Stand-alone photovoltaic-powered electrochromic smart window," *Electrochimica Acta*, 46 (2001) pp. 2125-2130.
DeForest et al., United States energy and $CO_2$ savings potential from deployment of near-infrared electrochromic window glazings, *Building and Environment*, 89 (2015) pp. 107-117.
Feng et al., "Competing Fracture in Kinetically Controlled Transfer Printing," *Langmuir*, 23 (2007) pp. 12555-12560.
Hu et al., "Scalable Coating and Properties of Transparent, Flexible, Silver Nanowire Electrodes," *ACSNano*, 4:5 (2010) pp. 2955-2963.
Huang et al., "Photovoltaic electrochromic device for solar cell module and self-powered smart glass applications," *Solar Energy Materials & Solar Cells*, 99 (2012) pp. 154-159.
Judeinstein et al., "Electrochemical degradation of $WO_3$ —$n$ $H_2O$ thin films," *Solid State Ionics*, 51 (1992) pp. 239-247.
Kim et al., "Unusual strategies for using indium gallium nitride grown on silicon (111) for solid-state lighting," *PNAS*, 108:25 (2011) pp. 10072-10077.

Kim et al., "Kinetically controlled, adhesiveless transfer printing using microstructured stamps," *Applied Physics Letters*, 94, 113502 (2009) pp. 1-4.
Korgel, "Composite for smarter windows," *Nature*, 500 (2013) pp. 278-279.
Kuo et al., "All-solid-state electrochromic device based on poly(butyl viologen), Prussian blue, and succinonitrile," *Solar Energy Materials & Solar Cells*, 93 (2009) pp. 1755-1760.
Martina et al., "Large area self-powered semitransparent trifunctional device combining photovoltaic energy production, lighting and dynamic shading control," *Solar Energy Materials & Solar Cells*, 160 (2017) pp. 435-443.
Meitl et al., "Transfer printing by kinetic control of adhesion to an elastomeric stamp," *Nature Materials*, 5 (2006) pp. 33-38.
Na et al., "Efficient and Flexible ITO-Free Organic Solar Cells Using Highly Conductive Polymer Anodes," *Advanced Materials*, 20 (2008) pp. 4061-4067.
Park et al., "Printed Assemblies of Inorganic Light-Emitting Diodes for Deformable and Semitransparent Displays," *Science*, 325 (2009) pp. 977-981.
Piccolo et al., "Performance requirements for electrochromic smart window," *Journal of Building Engineering*, 3 (2015) pp. 94-103.
Platt, "Electrochromism, a Possible Change of Color Producible in Dyes by an Electric Field," *Journal of Chemical Physics*, 34:3 (1961) pp. 862-863.
Sakunthala et al., "Energy storage studies of bare and doped vanadium pentoxide, $(V_{1.95} M_{0.05})O_5$, M= Nb, Ta, for lithium ion batteries," *Energy & Environmental Science*, 4 (2011) pp. 1712-1725.
Schuster et al., "Solid State Electrochromic Infrared Switchable Windows," *Solar Energy Materials*, 13 (1986) pp. 153-160.
Shehabi et al., "U.S. energy savings potential from dynamic daylighting control glazings," *Energy and Buildings*, 66 (2013) pp. 415-423.
Vosgueritchian et al., "Highly Conductive and Transparent PEDOT:PSS Films with a Fluorosurfactant for Stretchable and Flexible Transparent Electrodes," *Advanced Functional Materials*, 22 (2012) pp. 421-428.
Wang et al., "Electrochromic properties of rhodium oxide films prepared by a sol-gel method," *Thin Solid Films*, 401 (2001) pp. 211-215.
Xie et al., "XPS studies on surface reduction of tungsten oxide nanowire film by $Ar^+$bombardment," *Journal of Electron Spectroscopy and Related Phenomena*, 185 (2012) pp. 112-118.
Xue et al., "Electrochromic $WO_3$ thin films prepared by combining ion-beam sputtering deposition with post-annealing," *Materials Letters*, 149 (2015) pp. 127-129.
Yao et al., "Fabrication and assembly of ultrathin high-efficiency silicon solar microcells integrating electrical passivation and anti-reflection coatings," *Energy & Environmental Science*, 6 (2013) pp. 3071-3079.
Zhang et al., "An all-solid-state electrochromic device based on $NiO/WO_3$ complementary structure and solid hybrid polyelectrolyte," *Solar Energy Materials & Solar Cells*, 93 (2009) pp. 1840-1845.
Zhang et al., "Transparent, Conductive, and Flexible Carbon Nanotube Films and Their Application in Organic Light-Emitting Diodes," *Nano Letters*, 6:9 (2006) pp. 1880-1886.
Zilberberg et al., "Inverted Organic Solar Cells with Sol-Gel Processed High Work-Function Vanadium Oxide Hole-Extraction Layers, *Advanced Functional Materials*," 21, (2011) pp. 4776-4783.
Nicholas C. Davy et al., "Pairing of near-ultraviolet solar cells with electrochromic windows for smart management of the solar spectrum," *Nature Energy*, 2, 17104 (2017) pp. 1-11.
Aubrey L. Dyer et al., "A Vertically Integrated Solar-Powered Electrochromic Window for Energy Efficient Buildings," *Advanced Materials*, 26 (2014) pp. 4895-4900.
Roger J. Mortimer, "Electrochromic Materials," *Annual Reviews of Materials Research*, 41 (2011) pp. 241-268.
Jongseun Yoon et al., "Ultrathin silicon solar microcells for semitransparent, mechanically flexible and microconcentrator module designs," *Nature Materials*, 9 (Oct. 5, 2008) pp. 907-939.
Mikayla A. Yoder et al., "Optimization of Photon and Electron Collection Efficiencies in Silicon Solar Microcells for Use in

(56) References Cited

OTHER PUBLICATIONS

Concentration-Based Photovoltaic Systems," *Advanced Materials Technologies*, 2, 1700169 (2017) pp. 1-9.

* cited by examiner

- IoT: Internet of Things
- uC: Micro-controller
- H-Bridge: Circuit for reversing the flow of current through a device
- Human End-Point Controller: Some device used by a human to control the EC device (i.e., phone application)

AUTONOMOUS LIGHT MANAGEMENT SYSTEM FOR A WINDOW AND METHOD OF CONTROLLING LIGHT TRANSMISSION

RELATED APPLICATION

The present patent document claims the benefit of priority under 35 U.S.C. § 119(e) to U.S. Provisional Patent Application No. 62/915,685, filed on Oct. 16, 2019, which is hereby incorporated by reference in its entirety.

FEDERALLY SPONSORED RESEARCH OR DEVELOPMENT

This invention was made with government support under grant numbers DE-SC0019140 and DE-SC0001293 awarded by the U.S. Department of Energy. The government has certain rights in the invention.

TECHNICAL FIELD

The present disclosure is related generally to "smart" window technology and more particularly to the integration of photovoltaic cells with electrochromic films for light management.

BACKGROUND

Windows with "smart" capabilities offer energy efficient alternatives to the double-pane windows that are typically employed in residential and commercial buildings. For example, in response to an externally applied bias, electrochromic windows can dynamically control the transmitted solar flux by either absorbing or reflecting a portion of the incident solar spectrum. Such smart window technology may enable control over internal lighting and heating/cooling needs, thereby reducing energy consumption. The impact of such technology may be substantial, as about 30% of the total energy demand in the United States is due to internal lighting control and heating, ventilation, and air conditioning (HVAC) systems.

Electrochromic materials have been explored in research laboratories since the early 1960s and their integration into windows was intensively examined in the 1980s through the early 2000s; however, widespread commercialization has been limited by the need for complicated internal wiring and complete reinstallation of existing windows. Advancements are needed to circumvent this complexity if electrochromic-based smart windows are to become widely incorporated into residential and commercial buildings.

BRIEF SUMMARY

An autonomous light management system for a window includes an electrochromic film stack comprising an electrochromic layer on a first transparent electrode, an ion storage layer on a second transparent electrode, and an electrolyte sandwiched between the ion storage and electrochromic layers. The electrochromic film stack exhibits a transmissive state or an absorptive state depending on charging or discharging of the electrochromic layer. The light management system further comprises an array of power units disposed on a front surface of the electrochromic film stack, where each power unit comprises at least one solar microcell. Collectively, the solar microcells cover an area no greater than about 6% of a total area of the front surface. The array of power units is configured to control the charging and discharging of the electrochromic layer, thereby manipulating light transmission through the electrochromic film stack.

A method of controlling light transmission includes: (1) exposing an autonomous light management system to light, the autonomous light management system including: (a) an electrochromic film stack comprising an electrochromic layer on a first transparent electrode; an ion storage layer on a second transparent electrode; and an electrolyte sandwiched between the ion storage and electrochromic layers; and (b) an array of power units disposed on a front surface of the electrochromic film stack, each power unit comprising at least one solar microcell, wherein the solar microcells collectively cover an area no greater than about 6% of a total area of the front surface; and (2) applying a potential difference (bias voltage) to the electrochromic film stack, thereby charging or discharging the electrochromic layer such that the electrochromic film stack exhibits a transmissive or an absorptive state. To apply the positive or the negative voltage to the electrochromic film stack, one or more of the power units (and thus the associated solar microcells) may be electrically connected to the first and second transparent electrodes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Utilizing incident solar radiation to power electrochromic windows may circumvent some of the complexity of retrofitting existing windows with electrochromic technology. Described herein is the integration of small-scale inorganic photovoltaic devices (or "solar microcells") with an electrochromic film stack to form an autonomous light management system. The solar microcells, which may have a microscale thickness (less than 100 microns) and small area (less than 1 mm$^2$), can be arranged in a low-density array on a front surface of the electrochromic film stack. Such an arrangement may ensure light transparency while providing sufficient switching power to control light transmission through the electrochromic film stack. In addition, the solar microcells and components of the electrochromic film stack may be prepared on polymeric substrates, allowing for construction of a flexible autonomous light management system.

Figure 1A:
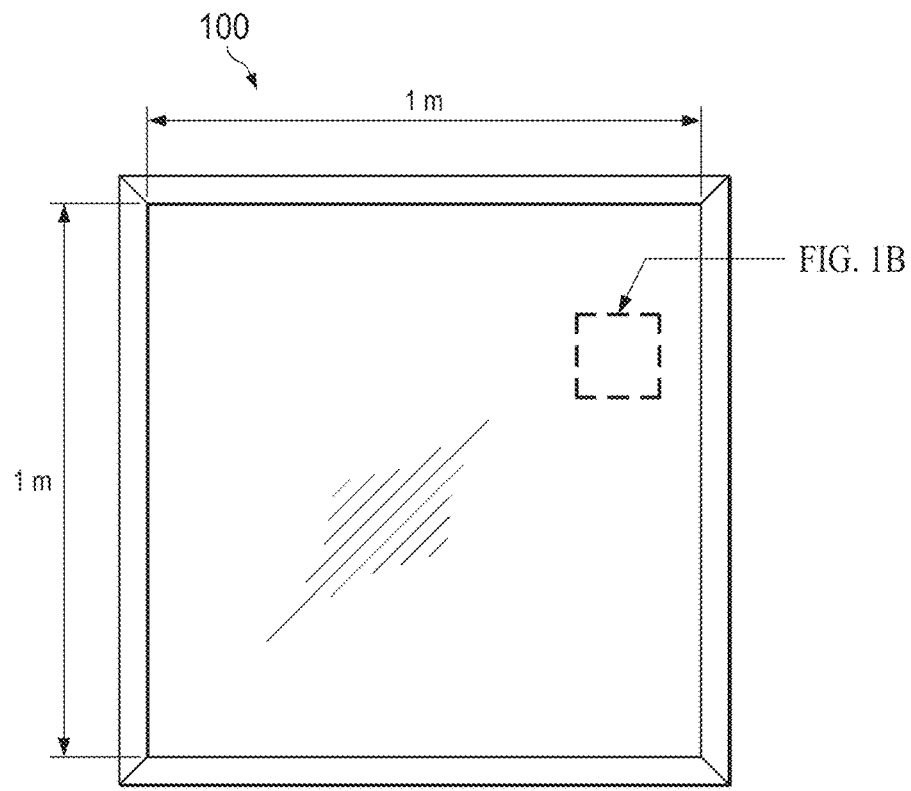
FIGS. 1A-1C show top view schematics of an exemplary autonomous light management system for a window at decreasing size scales.
Figure 1B:
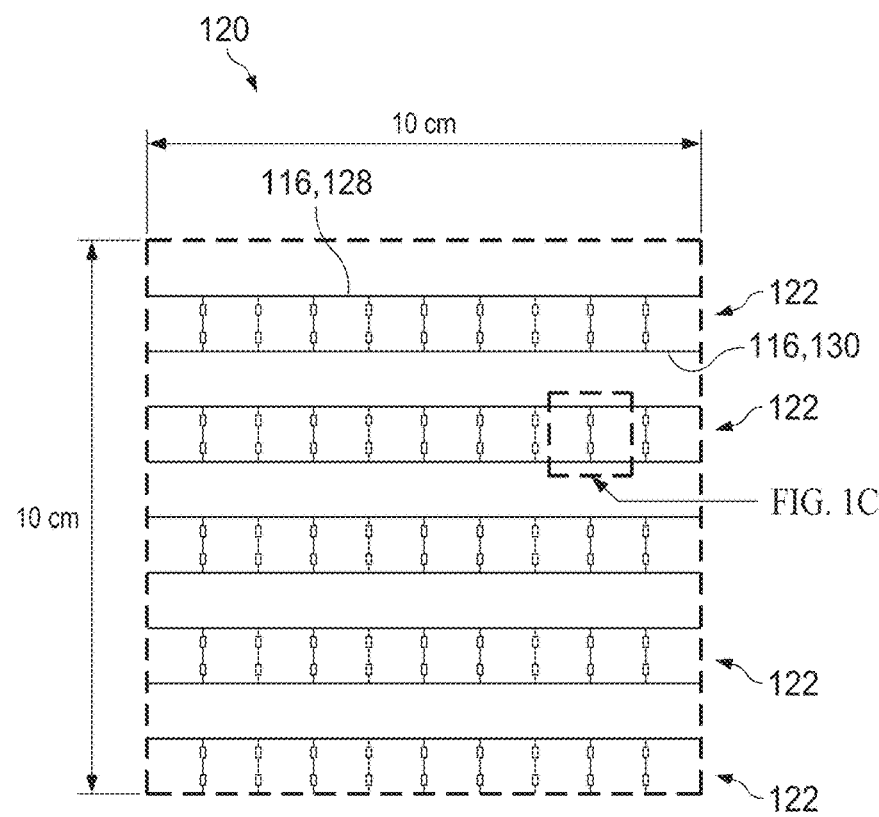
Figure 1C:
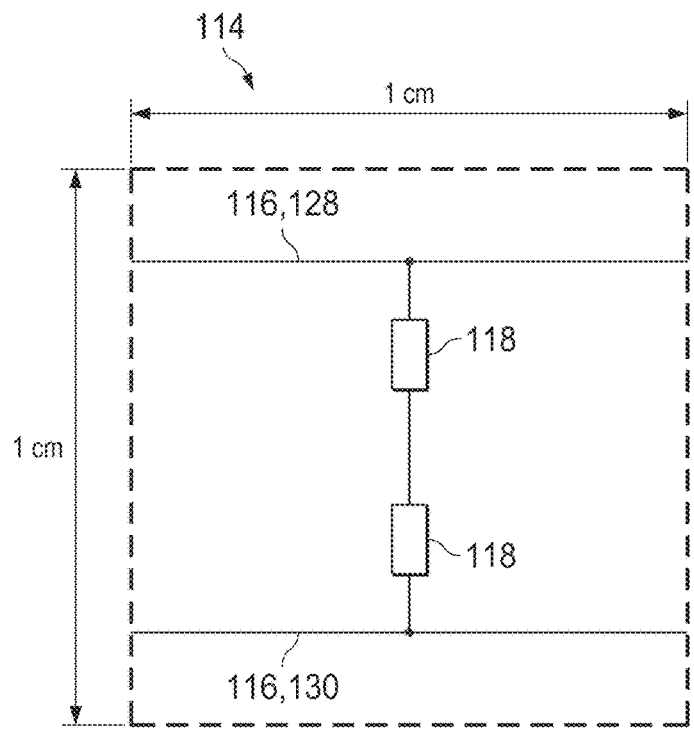
Figure 1D:
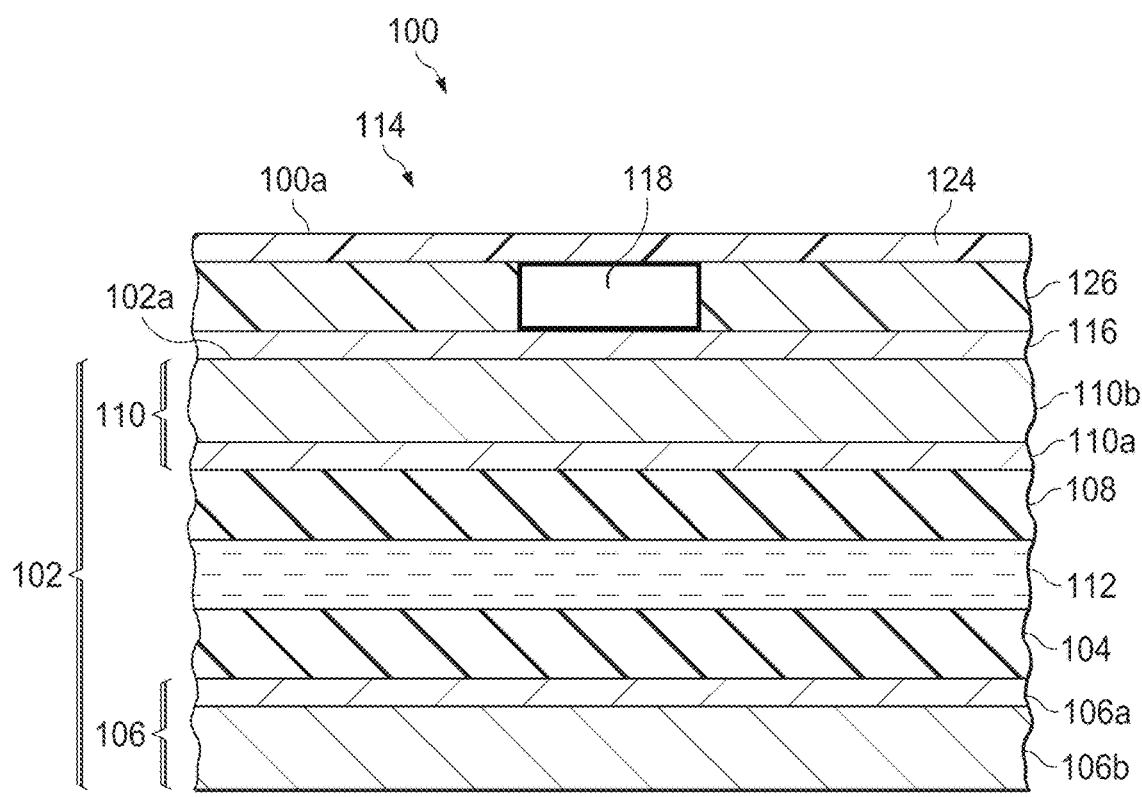
FIG. 1D shows a cross-sectional view of the exemplary autonomous light management system of FIG. 1C.

FIGS. 1A-1C provide front views of an autonomous light management system 100 for a window at decreasing size scales, and FIG. 1D shows a cross-sectional view of FIG. 1C. Referring first to FIG. 1D, the autonomous light management system 100 includes an electrochromic film stack 102 comprising an electrochromic layer 104 on a first transparent electrode 106, an ion storage layer 108 on a second transparent electrode 110, and an electrolyte 112 sandwiched between the ion storage and electrochromic layers 108,104. Each of the first and second transparent electrodes 106,110 comprises a transparent conductive film 106a,110a on a transparent substrate 106b,110b. An object or material described as "transparent" in this disclosure is understood to be substantially transparent to visible light, such that at least about 75%, or at least about 90%, of incident light passes through the object or material.

The electrochromic film stack 102 exhibits a transmissive (or "bleached") state or an absorptive (or "colored") state depending on charging or discharging—and consequently coloration—of the electrochromic layer 104. The transmissive and absorptive states of the electrochromic film stack 102 may be defined by a maximum difference in transmission T (or maximum transmission modulation $\Delta T_{max}$) at a given wavelength, where the transmission T measures the percentage of incident light which is transmitted. The maximum transmission modulation may be at least about 30%, and is preferably at least about 40% or at least about 50%, at a visible wavelength. Accordingly, the transmissive state of the electrochromic film stack 102 may refer to a state where at least about 70%, at least about 75%, or at least about 80% of incident light is transmitted, whereas the absorptive state may refer to a state where no more than about 40%, no more than about 35%, or no more than about 30% of incident light is transmitted. The charging and discharging are controlled by an array of power units 114 integrated with (or configured for electrical connection to) the electrochromic film stack 102. Each power unit 114 includes at least one solar microcell 118, which preferably covers an area of about 1 mm$^2$ or less per solar microcell 118, and may cover an area as small as 0.003 cm$^2$ per solar microcell 118, or even smaller.

The power units 114 and associated interconnects 116 may be positioned on a front surface 102a of the electrochromic film stack 102. If the solar microcells 118 include contacts on both the top and bottom surfaces, then the interconnects may be positioned along both the top and bottom surfaces. The solar microcells 118 may be embedded in a waveguide layer (or "light concentrator") 126 on the electrochromic film stack 102, as shown in FIG. 1D. A front transparent substrate 124, which may comprise glass or a polymer, may be disposed on the waveguide layer 126, providing a front surface 100a of the autonomous light management system 100 through which light enters. It may be beneficial for the autonomous light management system 100 to be flexible. For example, the light management system 100 may utilize polymeric instead of glass substrates, and thereby take the form of a flexible laminate for application onto a window (e.g., via an adhesive). The autonomous light management system 100 may be attached to or integrally formed with a window.

The power units 114 and thus the solar microcells 118 may be arranged in a two-dimensional (2D) array 120, as illustrated in FIG. 1B. Collectively, the solar microcells 118 cover an area no greater than about 6% of a total area of the front surface 102a, ensuring that light transmission through the front surface 102a of the electrochromic film stack 102 is largely unimpeded. Depending on the density of the array, the area covered by the solar microcells 118 may be no greater than about 3%, or no greater than about 1% of the total area of the front surface 102a. The interconnects 116 are electrically connected to the solar microcells 118 and configured for electrical connection to the first and second transparent electrodes 106,110 (or, more specifically, to the first and second transparent conductive films 106a,110a) for application of a positive or negative voltage. Each solar microcell 118 may comprise a silicon solar microcell, or a "silicon microcell." Fabrication of the inorganic solar microcells 118 from silicon (e.g., single-crystalline silicon) may enable a long lifetime and high performance. Alternatively, the solar microcells may be fabricated from III-V semiconductor materials such as GaAs, InP, GaP, InGaAs, and/or others known in the art.

Consistent with the above description, a method of controlling light transmission may comprise a first step of exposing an autonomous light management system 100 to light (e.g., solar radiation). As described above and shown in FIGS. 1A-1D, the autonomous light management system 100 may include: (a) an electrochromic film stack 102 comprising an electrochromic layer 104 on a first transparent electrode 106, an ion storage layer 108 on a second transparent electrode 110, and an electrolyte 112 sandwiched between the ion storage and electrochromic layers 108,104; and (b) an array 120 of power units 114 disposed on a front surface 102a of the electrochromic film stack 102, each power unit 114 comprising at least one solar microcell 118, where, collectively, the solar microcells 118 cover an area no greater than about 6% of a total area of the front surface 102a. In a second step, a potential difference (bias) voltage may be applied to the electrochromic film stack 102, thereby charging or discharging the electrochromic layer 104 such that the electrochromic film stack 102 exhibits a transmissive or an absorptive state. To apply the bias voltage to the electrochromic film stack 102, one or more of the power units 114 (and thus the associated solar microcells 118) may be electrically connected to the first and second transparent electrodes 106,110, as described further below.

For example, upon application of a low potential to the electrochromic layer 104 relative to the ion storage layer 108 in the electrochromic film stack 102, the electrochromic layer 104 may be charged or lithiated, such that the electrochromic layer 104 becomes colored and the electrochromic film stack 102 transitions to the absorptive or colored state. The electrolyte 112 may facilitate movement of charged species (e.g., lithium ions) between the ion storage layer 108 and the electrochromic layer 104. Upon application of a high potential to the electrochromic layer 104 relative to the ion storage layer 108 in the electrochromic film stack 102, the electrochromic layer 104 may be discharged and the ion storage layer 108 may be charged or lithiated, such that the electrochromic layer 104 becomes transmissive and the electrochromic film stack 102 transitions to the transmissive or bleached state.

Advantageously, the charging or discharging of the electrochromic layer 104 may occur over a time duration as short as a few minutes (e.g., about 3 minutes or less) or even as short as a few seconds, depending on the number of microcells and the illumination conditions. Ideally, the time duration may be about 40 s or less, e.g., from about 1 s to about 40 s, from about 1 s to about 20 s, or from about 1 s to about 10 s. When the bias on the electrochromic film stack 102 is switched (preferably at least ±0.5 V), the electrochromic film stack 102 may be cycled between the transmissive state and the absorptive state. As indicated above, light transmission through the electrochromic film stack may be modulated with a $\Delta T_{max}$ of at least about 30%.

As indicated above, the electrochromic film stack 102 includes an electrochromic layer 104, an ion storage layer 108, and an electrolyte 112 between the two. The electrochromic layer 104 comprises an electrochromic material, which may be understood to be a material that undergoes a change, evocation or bleaching of color in response to an electron-transfer (redox) process or a sufficient electrochemical potential. Electrochromic materials may be classified as type I, II, or III (e.g., see Mortimer, R. J., *Annu. Rev. Mater. Res.*, 41 (2011) pp. 241-68), where type III electrochromic materials, including metal oxides, may be employed here. In type III electrochromic materials, both or all redox states are solid.

Accordingly, the electrochromic layer 104 may comprise an electrochromic material selected from tungsten oxide, cerium oxide, chromium oxide, cobalt oxide, copper oxide, iridium oxide, iron oxide, manganese oxide, molybdenum oxide, nickel oxide, niobium oxide, palladium oxide, praseodymium oxide, rhodium oxide, ruthenium oxide, tantalum oxide, titanium oxide, vanadium oxide, a polymeric viologen, a conjugated conducting polymer, a metallopolymer, and/or metal hexacyanometallate Prussian blue.

One or both of the electrochromic and the ion storage layers 104,108 may comprise a metal oxide. Among the metal oxides, it is known that tungsten oxide, molybdenum oxide, iridium oxide, and nickel oxide show the most intense electrochromic color changes, and thus these metal oxides are preferred for the electrochromic layer 104. The other metal oxides mentioned above (e.g., vanadium oxide, cerium oxide, chromium oxide, etc.) may be more suitably used as an optically-passive material for the ion storage layer 108.

The electrolyte 112 may comprise a solid or semi-solid (e.g., gel) electrolyte. Suitable electrolytes may include $LiNbO_3$, hydrogen uranyl phosphate tetrahydrate, and $MgF_2$, in the case of solid electrolytes, and polyelectrolytes and polymer electrolytes in the case of semi-solid or gel electrolytes, such as propylene carbonate (PC), poly(methyl methacrylate) (PMMA), poly(AMPS), Nafion®, polystyrene sulfonic acid, and poly(acrylic acid). Gel electrolytes may combine the advantages of liquid and solid electrolytes by providing higher conductivities while remaining mechanically robust. Liquid electrolytes may have the disadvantage of possible leakage from the device, while solid electrolytes may have ionic conductivities too low to allow facile lithiation and delithiation of the electrochromic and ion storage layers 104,108. Accordingly, the electrolyte 112 preferably comprises a semi-solid or gel electrolyte.

The transparent conductive films 106a,110a that constitute the electrically conductive part of the first and second transparent electrodes 106,110 may comprise a transparent conductive oxide or a transparent conductive polymer known in the art. For example, the transparent conductive films 106a,110a may comprise a transparent conductive oxide selected from indium tin oxide (ITO), indium-doped zinc oxide, aluminum-doped zinc oxide, antimony-doped tin oxide, and/or tin oxide. It is also contemplated that the transparent conductive films 106a,110a may comprise carbon and/or a metal, such as a carbon- or metal-based film or carbon- or metal-based nanostructures. The transparent substrates 106b,110b may comprise glass or a polymer. Advantageously, the first and second transparent electrodes 106, 110 are substantially transparent to optical and/or infrared wavelengths.

In one example, an exemplary electrochromic film stack 102 includes an electrochromic layer 104 comprising tungsten oxide (e.g., $WO_3$), an ion storage layer 108 comprising vanadium oxide (e.g., $V_2O_5$), and an electrolyte 112 comprising a gel electrolyte (e.g., poly(methyl methacrylate) (PMMA), propylene carbonate (PC), and a lithium salt (e.g., lithium bis(trifluoromethanesulfonyl)imide (LiTFSI)). The first and second transparent electrodes 106,110 may each include an ITO film on a glass or polymer substrate. The solar microcells 118 integrated with the electrochromic film stack 102 may comprise silicon microcells.

Figure 2:
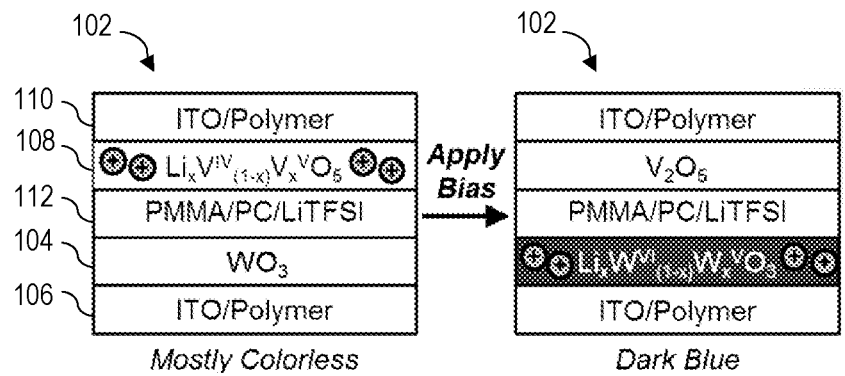
FIG. 2 is a schematic of an exemplary electrochromic film stack in the transmissive or bleached state (left) and in the absorptive or colored state (right) after application of a voltage bias.

An external bias (potential difference) may cause lithiation of the electrochromic or ion storage layer 104,108, resulting in either coloration or bleaching. This is illustrated in FIG. 2, which shows a simple cross-sectional schematic of the exemplary electrochromic film stack 102 in the transmissive or bleached state (left side) and the absorptive or colored state (right side). In this example, the redox reactions of both layers are as follows:

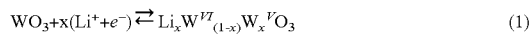

$$WO_3 + x(Li^+ + e^-) \rightleftarrows Li_xW^{VI}_{(1-x)}W_x^VO_3 \qquad (1)$$

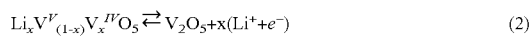

$$Li_xV^V_{(1-x)}V_x^{IV}O_5 \rightleftarrows V_2O_5 + x(Li^+ + e^-) \qquad (2)$$

where the left side of the reactions correspond to the bleached state and the right side to the colored state. Movement of lithium ions is facilitated by using a gel electrolyte.

The exemplary gel electrolyte comprising PMMA, PC, and LiTFSI may be prepared by mixing a 1 M solution of LiTFSI in PC with a high molecular weight PMMA network. Each metal oxide film may be prepared via sol-gel methods on a transparent conductive oxide-coated substrate (e.g., indium-tin oxide (ITO) on glass or a polymer), ultimately forming an oxide network via hydrolysis/condensation of the respective metal alkoxide. This type of film preparation allows for ease of processing and scalability as compared to typical thermal evaporation. Fabrication and characterization of the metal oxide films and the gel electrolyte are described in greater detail below.

Assembly of the electrochromic film stack 102 may entail reducing an electrochromic layer 104 formed on a first transparent electrode 106 and casting a gel electrolyte 112 onto an ion storage layer 106 formed on a second transparent electrode 110. The transparent electrode-supported electrochromic layer 106,104 (e.g., a $WO_3$ film on an ITO/glass or ITO/polymer substrate) may then be assembled with the transparent electrode-supported ion storage layer 110,108 (e.g., a $V_2O_5$ film on an ITO/glass or ITO/polymer substrate), with the gel electrolyte 112 in between. The electrochromic film stack 102 may be molded to a predetermined thickness established by microscale glass bead spacers (e.g., 100 μm-diameter) placed prior to assembly. The entire film stack 102 may be encapsulated with a transparent polymer (e.g., a curable photopolymer such as Norland Optical Adhesive 61 ("NOA61")), preferably in an inert environment to prevent oxygen from permeating into the film stack 102 and oxidizing the pre-reduced electrochromic layer 104.

Integration of the solar microcells 118 with the electrochromic film stack 102 may entail transfer printing and assembly. Silicon microcells (or other suitable photovoltaic devices) 118 may be fabricated and transfer printed as known in the art (e.g., as described in M. A. Yoder et al., *Adv. Mater. Technol.*, 2 (2017) 1700169). Typically, the solar microcells are transfer printed onto a glass or polymeric transparent first substrate. The solar microcells and transparent first substrate may then be coated with an uncured polymer, such as the curable photopolymer mentioned above, and sandwiched with a second transparent substrate. After curing (e.g., UV curing) to encapsulate the solar microcells 118 within a cured polymer, which may function as a waveguide layer 126 during use, the second substrate may be removed and interconnects 116 may be formed by metal patterning methods known in the art to provide electrical connection to the solar microcells 118. Ultimately, the waveguide layer 126, which includes the solar microcells 118 and interconnects 116 and is disposed on the first transparent substrate, may be joined (e.g., with a transparent adhesive) to the electrochromic film stack 102, as shown in FIG. 1D, such that the first transparent substrate becomes the front transparent substrate 124 of the autonomous light management system 100.

Typically, the autonomous light management system 100 has a microscale thickness in a range from about 100 microns to about 600 microns, where a majority of the thickness may be attributed to the front transparent substrate 124, the transparent electrodes 106b,110b, the electrolyte 112, and the waveguide layer 126. An exemplary transparent electrode may include a transparent conductive film of about 100 nm to about 300 nm in thickness on a polymer or glass substrate of about 50 microns to about 200 microns in thickness. Exemplary ion storage and electrochromic layers may (each) have a thickness in a range from about 100 nm to 300 nm, and an exemplary gel electrolyte may have a thickness in a range from about 50 microns to about 200 microns. If polymeric substrates are employed instead of glass, then the autonomous light management system 100 may be flexible.

The front surface 102a of the film stack 102 (and/or the front surface 100a of the light management system 100) may have an area in a range from a few square centimeters to tens or hundreds of square meters, e.g., from 1 cm² to 50 m². For commercial applications, the area is typically in a range from about 1 m² to about 50 m². Typically, a ratio of the area of the front surface of the electrochromic film stack to the area of the solar microcells 118 is at least about 166, which means the areal density of the solar microcells 118 may be less than 1%. To increase the switching speed, the number density of the power units (and thus the solar microcells) on the front surface of the electrochromic film stack may be increased up to an areal density of about 6%. In other words, the number of microcells 118 per unit area, or the microcell density, may be increased to enhance switching speed, ideally without significantly impacting the light transparency of the array 120.

Referring again to FIG. 1C, it may be beneficial for each power unit 114 to include a number of solar microcells 118 connected in series to increase the open-circuit voltage ($V_{OC}$), that is, the maximum voltage available from each power unit 114. At higher values of $V_{OC}$, the contrast between the transmissive (bleached) state and the absorptive (colored) state of the electrochromic film stack 102 may be increased. In other words, at higher values of $V_{OC}$, the absorptive state or colored state may appear darker or more strongly colored compared to the transmissive or bleached state. This effect is discussed in greater detail below. For example, as shown in FIG. 1C, each power unit 114 may comprise at least two solar microcells 118 connected in series. Practically speaking, from two to six solar microcells 118 may be connected in series within each power unit 114.

Figure 3A:
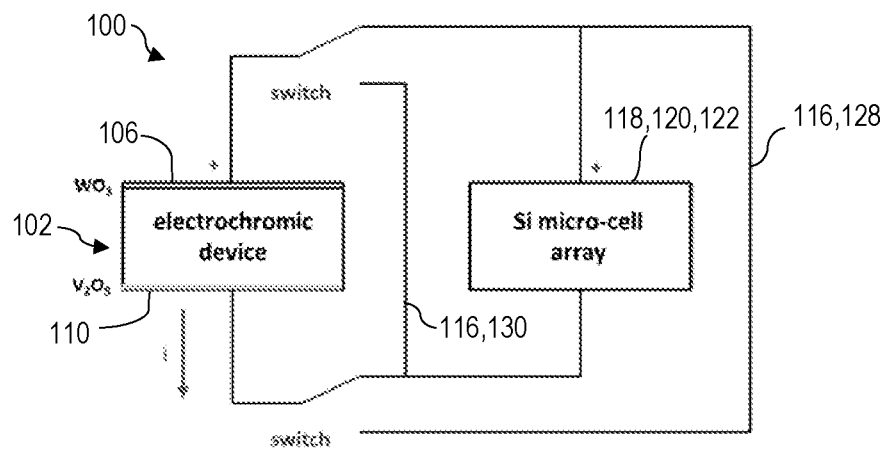
FIGS. 3A and 3B show simple circuit diagrams of the electrical connection between the solar microcells and the electrochromic film stack in the bleached and absorptive state, respectively.
Figure 3B:
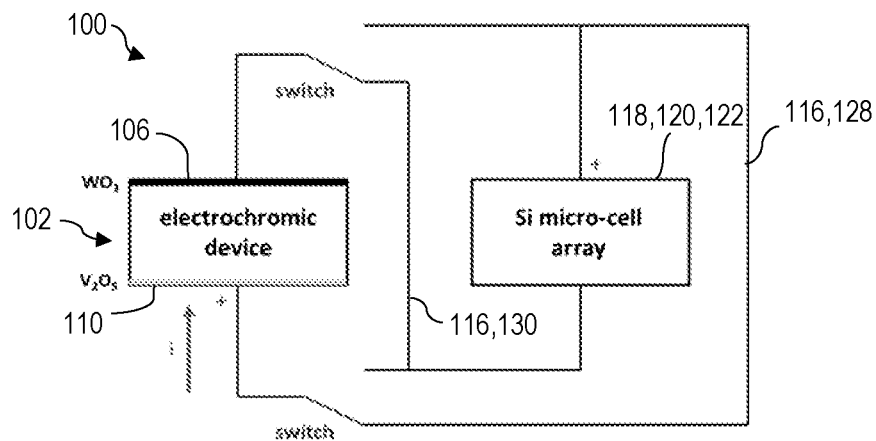
Figure 6:
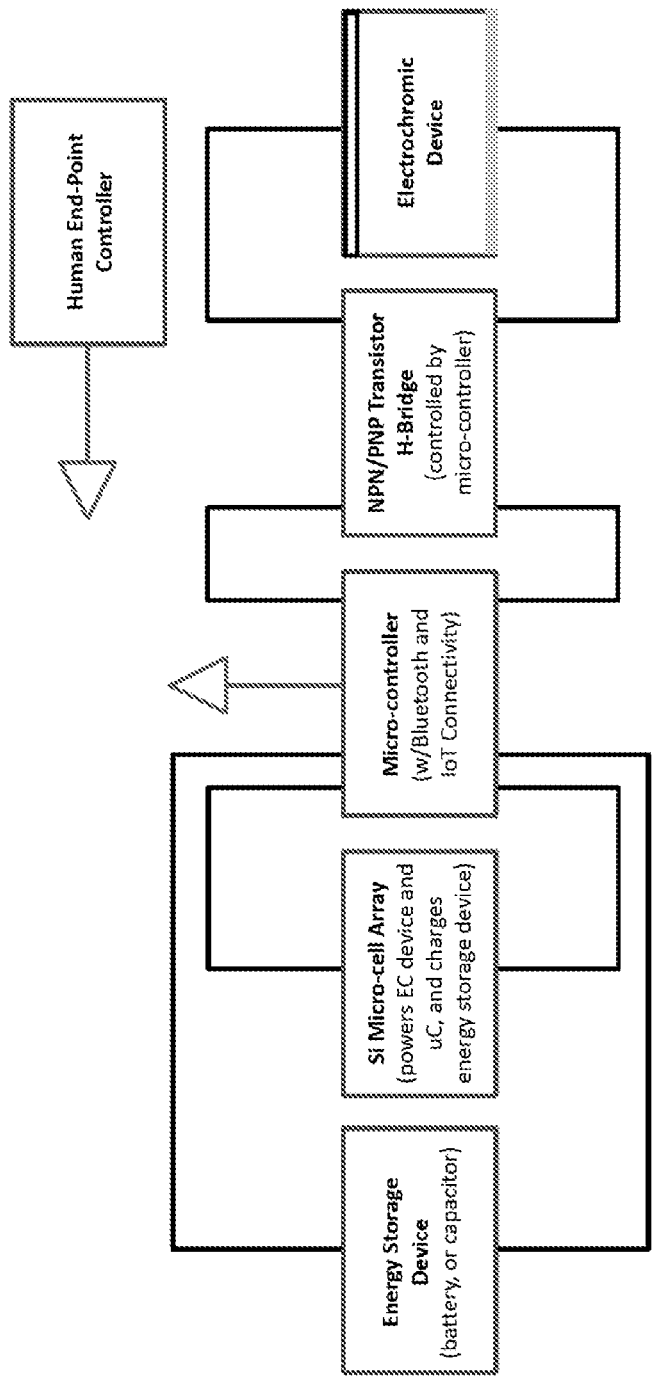
FIG. 6 is a schematic showing how the autonomous light management system may be connected with other devices to provide user control over the bias voltage and switching.

Referring again to FIGS. 1B and 1C, the interconnects 116 may comprise, for each line 122 of the 2D array 120, a first common bus 128 and a second common bus 130, where the power units 114 within each line 122 are connected in parallel to the first common bus 128 and the second common bus 130. Each of the first and second common buses 128,130 is electrically switchable between the first and second transparent electrodes 106,110, as illustrated in FIGS. 3A and 3B. FIG. 6 provides a schematic showing how the autonomous light management system may be connected with other devices to provide user control over the applied voltage and switching.

Figure 4A:
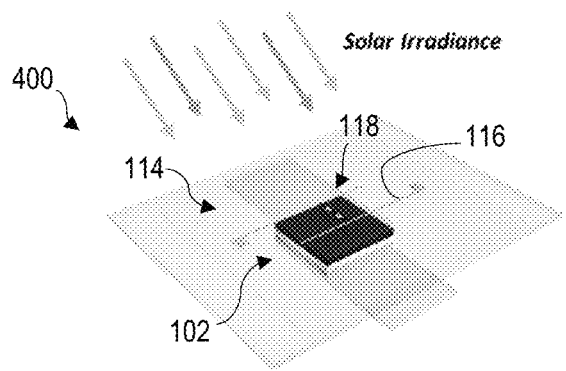
FIG. 4A shows a prototype light management system comprising a single power unit including two solar microcells connected in series and integrated with an electrochromic film stack.

A prototype light management system 400, as illustrated in FIG. 4A, is constructed based on a single power unit 114 including two silicon microcells 118 connected in series and integrated with an electrochromic film stack 102 covering an area of 1.2 cm×1.2 cm. In this example, switching is effected manually between the interconnects 116 and the first and second transparent electrodes 106,110 (as illustrated in FIG. 3B) using alligator clip test leads. Additional experimental details are provided below. With only a single power unit 114, the prototype light management system 400 may be considered to comprise a 1×1 array. For practical application of the autonomous light management system 100, the power units 114 may be arranged in a 2D array that may range in size from 2×2 to 10,000×10,000, and more typically the range may be from 100×100 to 1,000×1,000.

Figure 4B:
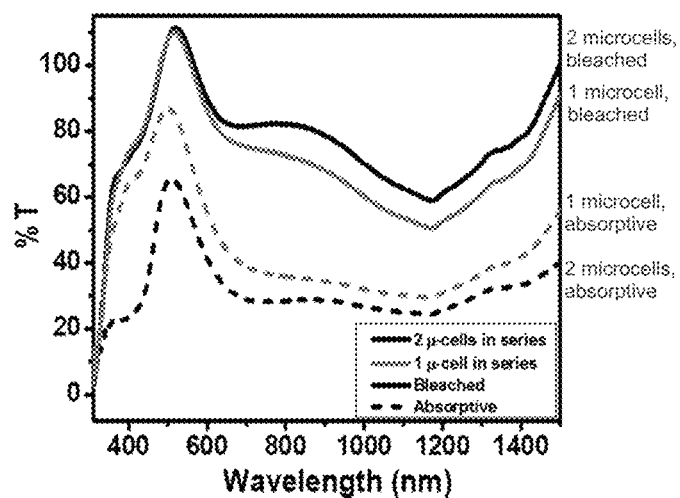
FIG. 4B shows light transmission as a function of wavelength for the prototype light management system of FIG. 4A in the bleached and absorptive states.

FIG. 4B shows light transmission as a function of wavelength for the prototype light management system 400. More specifically, the data show the transmission of the prototype system 400 powered by one and two silicon microcells in series in the bleached and absorptive states. When powered by two silicon microcells in series, the transmission may be modulated from roughly 40-75%, with a consistent $\Delta T_{max}$ of at least about 40%. $\Delta T_{max}$ is calculated as the maximum difference between light transmission (T) in the bleached/transmissive state and the absorptive/colored state at a given wavelength, as indicated above.

Figure 4C:
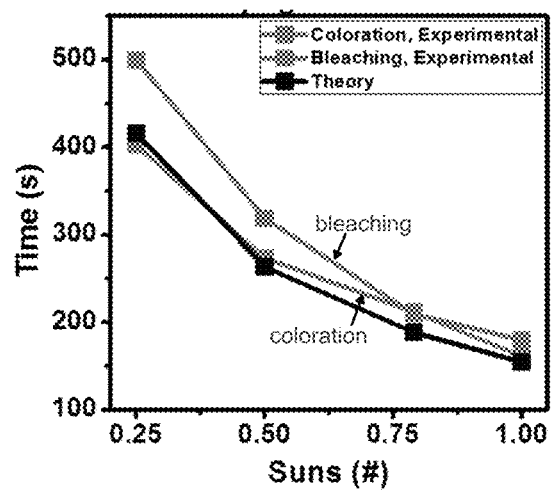
FIG. 4C shows calculated (and experimental) switching times for coloration and bleaching of the prototype light management system of FIG. 4A under varying irradiation in comparison with theoretical values.

Coloration and bleaching times can be calculated for the prototype system 400 by cycling between bleached and absorptive states. Referring to FIG. 4C, a voltage bias is held for 6 minutes and transmission at 600 nm is monitored before switching the electrical connection. At a light concentration of 1 sun, a coloration time of 160.9 seconds and a bleaching time of 179.4 seconds is observed for the prototype system. This corresponds to a $\Delta T_{max}$ of about 46% switching from 89.6% to 43.4%. The system also displays a memory effect. The silicon microcell interconnects are electrically connected to the transparent electrodes of the electrochromic film stack for 6 minutes and then disconnected while transmission continues to be measured. There is a slight increase/decrease in transmission of about 2% for the colored/bleached states after the bias from the silicon microcells is removed.

FIG. 4C summarizes the coloration and bleaching times for 1.00, 0.79, 0.50, and 0.25 suns, corresponding to times of day when there is less than 1 sun irradiation on the window of a building. As expected, with decreased irradiation (i.e., decreased current), the switching times increase. The theoretical values plotted are calculated based on the amount of injected charge and expected $J_{SC}$ values, assuming the microcell $J_{SC}$ is constantly provided to the electrochromic film stack. The experimental coloration times agree well with modelling predictions; the bleaching times show some deviations at low intensity likely due to asymmetric charge injection and extraction processes. Regardless of intensity, the magnitude of the limiting transmission modulation is dictated by the magnitude of the applied bias, or by the microcell $V_{OC}$.

Figure 4D:
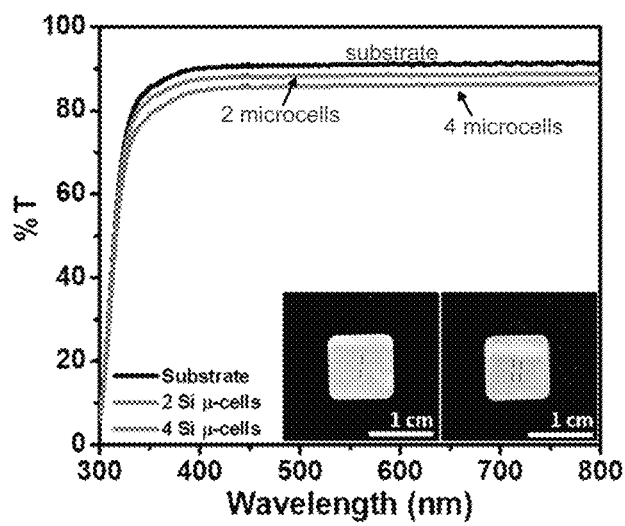
FIG. 4D shows light transmission for the transparent substrate alone and with two and four silicon microcells (inset images, respectively).
Figure 4E:
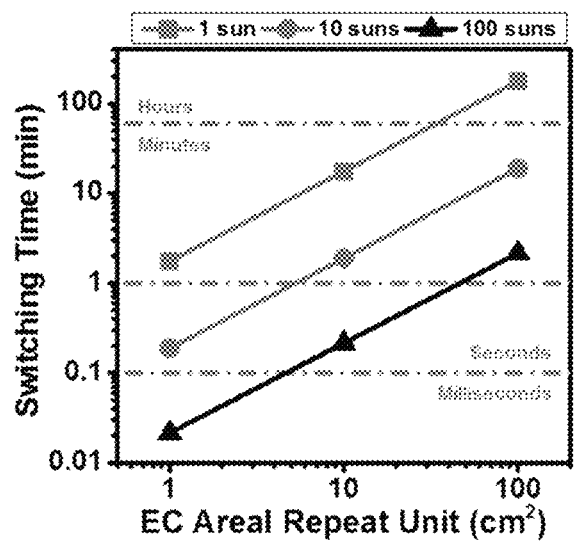
FIG. 4E shows calculated switching times as a function of silicon microcell density and light concentration for the prototype light management system of FIG. 4A.

There are multiple ways to decrease the switching times as illustrated by experiments on the prototype system. The most impactful approach may be to add additional solar microcells in parallel, thereby increasing microcell density, to increase the $J_{SC}$, as shown in FIG. 4E. This approach can be visualized in reference to FIG. 1B, where multiple power units 114, each including one or more solar microcells 118, are connected in parallel within each line 122 of the array 120. The additional microcells could reduce the transparency of the system; however, for large pitch configurations, this effect can be quite small, as illustrated by the data in FIG. 4D, which shows the transmission of two and four silicon microcells, corresponding to one and two pairs of silicon microcells in parallel in the exemplary design (i.e., a pair of two silicon microcells in series). The additional microcells reduce transmission by only about 2% while doubling the $J_{SC}$, thereby reducing the switching time from 152 to 76 seconds. Thus, the benefit of increased microcell density on switching time may significantly outweigh any associated decrease in transmission through the autonomous light management system.

In addition to or as an alternative to increasing microcell density, switching times may be reduced through light concentration using a waveguide layer 126, as demonstrated in FIG. 4E and as illustrated in FIG. 1D. Here, a larger "EC areal repeat unit" corresponds to a larger-area portion of the electrochromic film stack 102 powered a single power unit 114 (e.g., by two silicon microcells in series). Accordingly, a larger EC areal repeat unit corresponds to a reduced microcell density, which may be beneficial from a cost perspective. As the magnitude of the EC areal repeat unit is increased (i.e., as the microcell density is decreased), the switching time of the system increases for a given light concentration, but less active photovoltaic material is consumed. At high EC areal repeat unit sizes (or low microcell densities), however, the decrease in switching time can be compensated for by increasing the light concentration. For example, as shown in FIG. 4E, an EC areal repeat unit of 100 cm² under 1 sun (shown in blue) has a switching time on the order of hours, but a faster switching time (e.g., on the order of minutes) can be recovered with a light concentration of 100 suns (shown in black). In addition, light concentration increases the $V_{OC}$ logarithmically and can therefore also increase the maximum modulation in transmission.

Figure 4F:
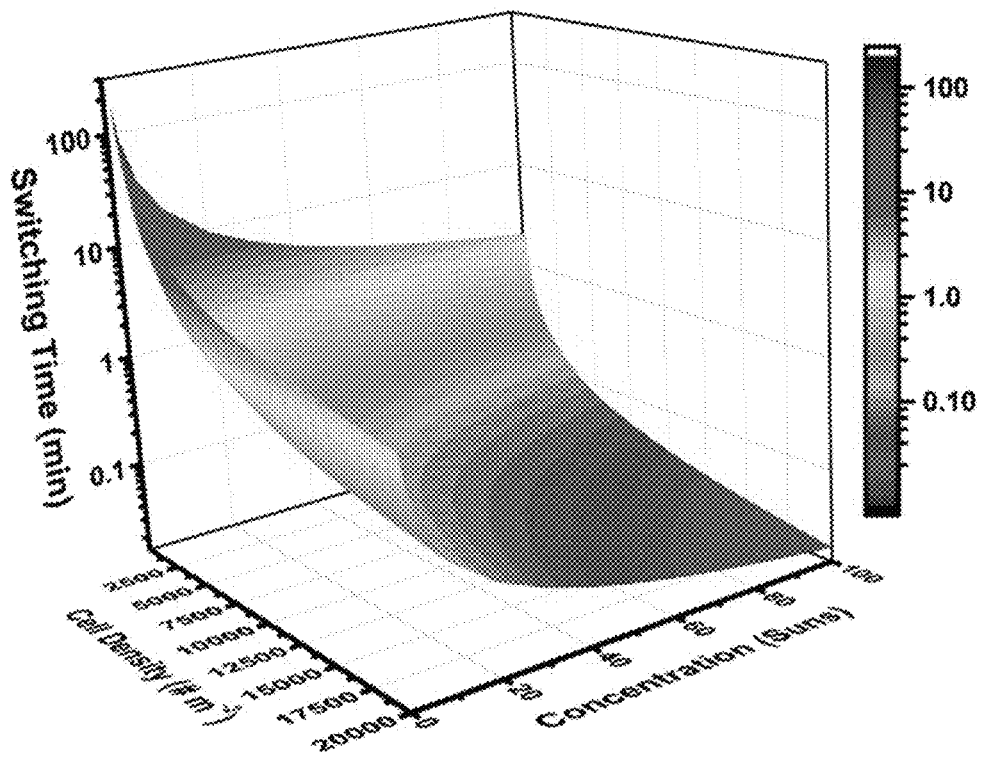
FIG. 4F shows calculated switching times as a function of silicon microcell density and light concentration for a larger (e.g., square-meter scale) light management system.

The effect of combining these two strategies (changing microcell density and/or light concentration) to manipulate switching times is explored in FIG. 4F, which may serve as a guide to fabricating an autonomous light management system for windows with a desired switching time at small or large scales (e.g., at the square-meter scale). One axis corresponds to increased cell density, or increased microcells in parallel, a second axis corresponds to light concentration, and the third axis shows switching time. Any combination of increased microcell density and light concentration can be used to balance overall transmission, cost, and switching times of the light management system. As shown in FIG. 4F, it is possible to achieve switching times of less than 1 minute for a reasonable amount of silicon microcells (e.g., 20,000 cells/m² or less, but up to 175,000 cells/m² is still practical) and modest degrees of light concentration (e.g., up to 30 Suns).

EXAMPLES

Fabrication of Electrochromic Film Stack

In this example, metal oxide films are prepared via sol-gel methods. Precursor solutions are spin-coated on a substrate, either glass or ITO-coated glass followed by thermal annealing, which expels residual solvent as well as structurally reorganizes the metal oxide layers. Following preparation of a gel-based lithium electrolyte, the device is assembled. Details of the syntheses and device assembly are described below.

Preparation of Electrochromic Layer

In this example, the sol-gel synthesis of tungsten (VI) oxide is described. To prepare $WO_3$ thin films, 0.25 g of $WOCl_4$ is combined with 5 mL isopropanol (IPA) and stirred overnight until the solution is homogeneous and clear. The $WOCl_4$ powder is weighed in a glovebox with $O_2$ concentration <3 ppm and transferred to a septum-sealed flask; then isopropyl alcohol (IPA) is added with a syringe and the solution is stirred overnight. The homogeneous, clear solution is spin-coated onto the desired substrate (e.g., ITO-coated glass or plastic) at 1200 rpm, allowing ambient room humidity to hydrolyze the film. The film is then annealed in a tube furnace open to air at 150° C. for 1 hour to drive off the residual solvent. This process is repeated (spin-coating and annealing) twice more, for a total of three layers. The total layer thickness is approximately 207 nm, as determined through optical profilometry.

Preparation of Ion Storage Layer

In this example, the sol-gel synthesis of vanadium (V) oxide is described. The $V_2O_5$ films are prepared from the sequential hydrolysis and condensation of $VO(OC_3H_7)_3$, following a modified procedure known in the art. IPA is added as a solvent, acetic acid as a catalyst, and water to hydrolyze the reaction. The use of air humidity to hydrolyze the isopropoxide may not yield consistent results, and therefore water is added in a 1:1 mole ratio with the precursor. The precursor solution is spin-coated onto the desired substrate (e.g., ITO-coated glass or polymer) at 1800 rpm and annealed in a tube furnace at 300° C. under pure $O_2$ flow (~0.2 slpm) to promote condensation via dehydration as well as to drive off residual solvent and water from the hydrolysis protocol. A total of three layers were deposited and heat treated to give a thickness of approximately 166 nm, as determined through optical profilometry.

Preparation of Gel Electrolyte

In this example, preparation of a gel electrolyte comprising PC, LiTFSI and PMMA is described. In a first step to prepare the gel electrolyte, a 1 M lithium bis(trifluoromethanesulfonyl)imide (LiTFSI) solution in propylene carbonate (PC) is formed in a glovebox. After the salt is dissolved, 35 wt. % poly(methyl methacrylate) (PMMA, Mw=120,000, Sigma Aldrich) is added while the solution is vigorously stirred. To completely homogenize the gel, the solution is manually stirred and left on low heat. The solution is kept in a dry box to prevent the LiTFSI from absorbing water.

Assembly of Electrochromic Film Stack

In this example, an exemplary electrochromic film stack is assembled. The above-described gel electrolyte is first spread over a $V_2O_5$ film on ITO/glass and degassed for over 12 hours. Concurrently, a $WO_3$ film on ITO/glass is pre-lithiated in a glovebox using 0.1 M LiTFSI in PC and a lithium metal counter and reference electrode. The $WO_3$ film is reduced at 2.1 V vs. Li/Li$^+$ to switch the film to its colored state. The film is then rinsed with PC, dried, and taken out of the glovebox. To obtain reproducible thicknesses of the gel electrolyte, soda lime glass beads with diameters of 100 μm (SPI, Product 2720-AB) are used as spacers. These are placed in the corners of the degassed gel electrolyte on $V_2O_5$ and the reduced $WO_3$ film is placed on top. This assembly is then brought into the glovebox and encapsulated with a photopolymer (e.g., NOA61) on each edge of the glass. The NOA61 is cured under UV (365 nm, 4 w) for 40 minutes.

Characterization of the Electrochromic Film Stack

Figure 5A:
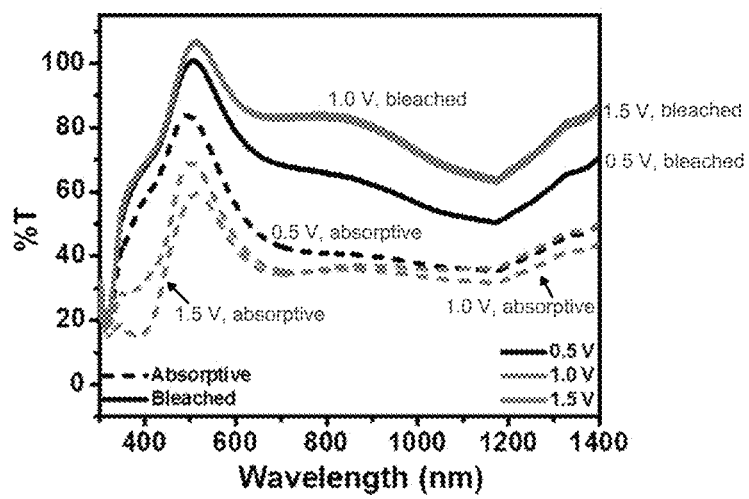
FIG. 5A shows light transmission through a prototype electrochromic film stack with varying voltage bias in the absorptive (colored) and transmissive (bleached) states.

The transmission modulation of a prototype electrochromic film stack prepared as described above is quantified in the spectra shown in FIG. 5A. The data were collected using an ITO-based blank with an air gap at wavelengths shorter than 1500 nm and with an air-based blank with no ITO at wavelengths above 1500 nm. Here, the device is biased at voltages corresponding approximately to the $V_{OC}$ values of one, two, and three silicon microcells connected in series, or 0.5 V, 1.0 V, and 1.5 V, respectively. As seen in the spectra, a bias of 0.5 V does not produce a large change in transmittance, with a $\Delta T_{max}$ of only 10-25%. The modulation is significantly increased when using either a 1.0 V or 1.5 V bias. Due to the rather small enhancement of $\Delta T_{max}$ when comparing the 1.0 V and 1.5 V bias, and the additional complexity when connecting three instead of two silicon microcells in series, the testing of a prototype light management system based on a single power unit including two silicon microcells connected in series and integrated with an electrochromic film stack (1.2 cm×1.2 cm area) is explored, as described above.

Figure 5B:
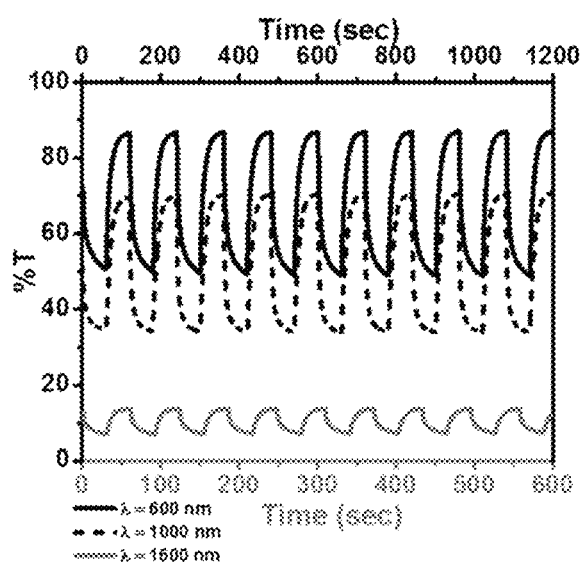
FIG. 5B shows cycling of the prototype electrochromic film stack between +/−1.0 V monitored at 600 nm, 1000 nm and 1600 nm.

The kinetics of the device can be analyzed by monitoring transmittance at specific wavelengths while cycling between a positive and negative bias. The results for a bias of 1.0 V are shown in FIG. 5B and Table 1 summarizes performance characteristics at each bias (i.e., 0.5 V, 1.0 V, and 1.5 V), where transmission is monitored at three wavelengths across the spectrum: 600 nm, 1000 nm, and 1600 nm. It is evident in FIG. 5B that performance at infrared wavelengths (e.g., 1600 nm) is adversely impacted due to the low transmission of the conductive ITO coating. Potential alternatives to ITO include conductive polymers, carbon-based electrodes, and thin metal films or nanostructures, but these tend to lack in conductivity and/or transparency. A non-infrared absorbing conductor may be advantageous for improved modulation capacities at longer wavelengths.

TABLE 1

Performance of Prototype Electrochromic Film Stack at Varying Wavelength and Bias

| Bias (V) | Coloration Time (sec) | Bleaching Time (sec) | $\Delta T_{max}$ (%) | $\Delta OD$ | Coloration Efficiency (cm$^2$ C$^{-1}$) |
|---|---|---|---|---|---|
| $\lambda$ = 600 nm | | | | | |
| 0.5 V | 34.0 | 36.9 | 14.5 | 0.096 | 43.2 |
| 1.0 V | 26.8 | 23.7 | 37.8 | 0.248 | 41.7 |
| 1.5 V | 13.3 | 8.1 | 46.2 | 0.330 | 29.0 |
| $\lambda$ = 1000 nm | | | | | |
| 0.5 V | 25.3 | 38.4 | 14.1 | 0.134 | 49.4 |
| 1.0 V | 16.2 | 25.4 | 36.7 | 0.317 | 50.6 |
| 1.5 V | 5.8 | 15.3 | 38.6 | 0.343 | 30.6 |
| $\lambda$ = 1600 nm | | | | | |
| 0.5 V | 20.8 | 21.8 | 2.0 | 0.085 | 41.9 |
| 1.0 V | 18.5 | 14.5 | 6.5 | 0.281 | 46.0 |
| 1.5 V | 7.2 | 9.3 | 7.3 | 0.333 | 29.3 |

As seen in Table 1, $\Delta T_{max}$ is correlated with the applied voltage. At 600 nm, $\Delta T_{max}$ increases from 14.5% to 46.2% with a 0.5 V and 1.5 V bias, respectively. The change in optical density, $\Delta OD$, follows with $\Delta T_{max}$ and is used to calculate the coloration efficiency, η:

$$\Delta OD = \log \frac{T_{bleached}}{T_{colored}} \quad (3)$$

$$\eta = \frac{\Delta OD}{Q} \quad (4)$$

where Q is the charge injected in C cm$^{-2}$. Of note is that η does not follow the same trend as that of $\Delta T_{ma}$, and $\Delta OD$; with an applied bias of 1.5 V, η decreases significantly. This is likely because the $\Delta T_{max}$ of the $WO_3$ electrochromic layer is reached before 1.5 V and the excess charge that is injected is essentially wasted; the $\Delta T_{max}$ of the $WO_3$ film could be increased with a thicker film to mitigate this.

Figure 5C:
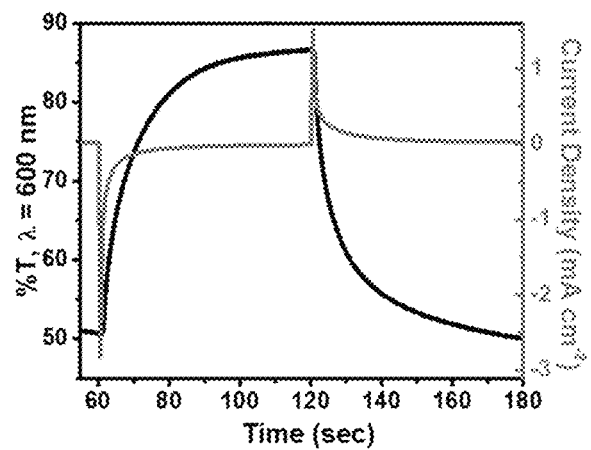
FIG. 5C shows one cycle of the prototype electrochromic film stack showing light transmission at 600 nm and the corresponding current.

FIG. 5C shows one cycle of the EC device between +1.0 V and −1.0 V plotted with the current density for a 60 second bias hold. The current density follows a capacitor-like behavior in which the device initially charges, corresponding to the large increase in the magnitude of the current density. This is related to the switching time of the device, whereas the voltage is related to the attainable modulation in transmittance. The switching times, defined as 0.9*$\Delta T_{max}$, can be found in Table 1 for each bias. For 600 nm, the coloration time is as rapid as 13.3 seconds for a 1.5 V bias, switching from 86.7-40.5% T. The switching times increase as lower voltages are applied, increasing to 26.8 and 34.0 seconds for 1.0 V and 0.5 V biases, respectively. This agrees well with Ohm's law, V=IR, where a larger voltage corresponds to a larger current and therefore shorter switching times.

The difference between the bleaching and coloration times is negligible apart from the data taken at 1000 nm, where the bleaching time is longer. This discrepancy main be explained by the difference in crystallinity between the two metal oxide films. It has been suggested that amorphous films can lead to faster switching times and facilitate charge injection/extraction. With this in mind, it is hypothesized that the semi-crystalline $V_2O_5$ film may kinetically limit the device to some degree, specifically at 1000 nm. Additionally, an asymmetric current density is observed with time (FIG. 5C) for each experiment.

Figure 5D:
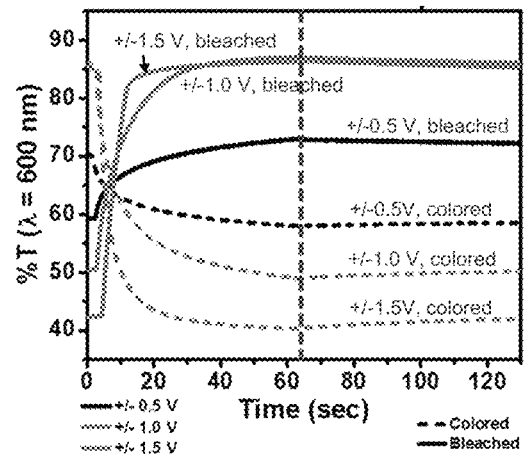
FIG. 5D shows light transmission as a function of time through the electrochromic film stack in both the bleached and colored states during voltage bias holds at 600 nm; the dashed vertical line indicates when the voltage bias is removed.

Both bleached and colored states are sustained after the applied bias is removed, as seen in FIG. 5D, where the bias is held for the first 60 seconds and then removed while the transmission is monitored continuously at 600 nm. A negligible change in transmission is observed, on the order of 1-2%, indicating significant long-term stability. Notably, in this design continued illumination on the window corresponds to a continued applied bias by the integrated solar microcells, and therefore the transmission is expected to remain constant over long periods of time depending on the intensity of incident illumination.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An autonomous light management system for a window, the autonomous light management system comprising:
    an electrochromic film stack comprising an electrochromic layer on a first transparent electrode, an ion storage layer on a second transparent electrode, and an electrolyte sandwiched between the ion storage and electrochromic layers, the electrochromic film stack exhibiting a transmissive state or an absorptive state depending on charging or discharging of the electrochromic layer;
    an array of power units disposed on a front surface of the electrochromic film stack, each power unit comprising at least one solar microcell, the solar microcells collectively covering an area no greater than about 6% of a total area of the front surface,
    wherein the array of power units is configured to control the charging and discharging of the electrochromic layer, thereby manipulating light transmission through the electrochromic film stack.

2. The autonomous light management system of claim 1, wherein each power unit comprises at least two of the solar microcells connected in series.

3. The autonomous light management system of claim 1, wherein each of the solar microcells covers an area of about 1 mm$^2$ or less.

4. The autonomous light management system of claim 1 further comprising interconnects electrically connected to the solar microcells and electrically connectable to the first and second transparent electrodes.

5. The autonomous light management system of claim 1, further comprising a waveguide layer on the front surface, the solar microcells being embedded in the waveguide layer.

6. The autonomous light management system of claim 1, wherein the solar microcells comprise silicon microcells.

7. The autonomous light management system of claim 1, wherein each of the first and second transparent electrodes comprises a transparent conductive film on a transparent substrate.

8. The autonomous light management system of claim 7, wherein the transparent conductive film comprises a material selected from the group consisting of: indium tin oxide (ITO), indium-doped zinc oxide, aluminum-doped zinc oxide, antimony-doped tin oxide, and tin oxide.

9. The autonomous light management system of claim 7, wherein the transparent substrate comprises glass or a polymer.

10. The autonomous light management system of claim 1 being flexible.

11. The autonomous light management system of claim 1 having a thickness in a range from about 100 microns to about 600 microns.

12. The autonomous light management system of claim 1, wherein the front surface of the electrochromic film stack has an area in a range from about 1 cm$^2$ to about 50 m$^2$.

13. The autonomous light management system of claim 1, wherein the electrolyte comprises a gel electrolyte.

14. The autonomous light management system of claim 1, wherein the electrochromic material comprises a material selected from the group consisting of: a metal oxide, a polymeric viologen, a conjugated conducting polymer, a metallopolymer, and a metal hexacyanometallate Prussian blue.

15. The autonomous light management system of claim 14, wherein the electrochromic material comprises a metal oxide selected from the group consisting of: tungsten oxide, molybdenum oxide, iridium oxide, and nickel oxide.

16. The autonomous light management system of claim 1, wherein the ion storage material comprises a metal oxide selected from the group consisting of: vanadium oxide, cerium oxide, chromium oxide, cobalt oxide, copper oxide, iron oxide, manganese oxide, niobium oxide, palladium oxide, praseodymium oxide, rhodium oxide, ruthenium oxide, tantalum oxide, and titanium oxide.

17. A method of controlling light transmission, the method comprising:
    exposing an autonomous light management system to light, the autonomous light management system including:
        an electrochromic film stack comprising an electrochromic layer on a first transparent electrode; an ion storage layer on a second transparent electrode; and an electrolyte sandwiched between the ion storage and electrochromic layers; and
        an array of power units disposed on a front surface of the electrochromic film stack, each power unit comprising at least one solar microcell, wherein the solar microcells collectively cover an area no greater than about 6% of a total area of the front surface; and
    applying a bias voltage to the electrochromic film stack, thereby charging or discharging the electrochromic layer such that the electrochromic film stack exhibits a transmissive or an absorptive state.

18. The method of claim 17, wherein the charging or discharging of the electrochromic layer occurs over a time duration of about 3 minutes or less.

19. The method of claim 17, further comprising switching the bias voltage to cycle the electrochromic film stack between the transmissive and the absorptive states.

20. The method of claim 19, wherein light transmission through the electrochromic film stack is modulated with a $\Delta T_{max}$ of at least about 30%.

* * * * *